United States Patent
Nishimura

(10) Patent No.: US 9,334,784 B2
(45) Date of Patent: May 10, 2016

(54) CONTROL DEVICE OF DIESEL ENGINE

(71) Applicant: Mazda Motor Corporation, Aki-gun, Hiroshima (JP)

(72) Inventor: Hiroyuki Nishimura, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 558 days.

(21) Appl. No.: 13/691,412

(22) Filed: Nov. 30, 2012

(65) Prior Publication Data

US 2013/0167508 A1    Jul. 4, 2013

(30) Foreign Application Priority Data

Dec. 28, 2011    (JP) .................. 2011-288575

(51) Int. Cl.
*F01N 9/00* (2006.01)
*F02D 41/02* (2006.01)
*F02D 41/12* (2006.01)
*F02D 41/40* (2006.01)

(52) U.S. Cl.
CPC ........ *F01N 9/002* (2013.01); *F01N 9/00* (2013.01); *F02D 41/029* (2013.01); *F02D 41/123* (2013.01); *F02D 41/405* (2013.01); *F02D 2200/0802* (2013.01); *Y02T 10/44* (2013.01)

(58) Field of Classification Search
CPC .............. F01N 3/023–3/0238; F01N 9/002; F01N 2430/10; F02M 25/0752; F02D 13/0203; F02D 13/0215; F02D 13/0261; F02D 13/0265; F02D 13/0273; F02D 41/006; F02D 41/029; F02D 41/12; F02D 41/123–41/126
See application file for complete search history.

(56) References Cited

FOREIGN PATENT DOCUMENTS

| DE | 102005015853 A1 | * 10/2006 | |
| JP | 2004316441 | 11/2004 | |
| JP | 2005201210 A | * 7/2005 | ................. F01N 3/02 |

OTHER PUBLICATIONS

Machine translation of DE 10 2005 015 853 A1, accessed Feb. 19, 2015.*
Machine translation of JP 2005-201210 A, accessed Feb. 19, 2015.*

* cited by examiner

*Primary Examiner* — Jonathan Matthias
(74) *Attorney, Agent, or Firm* — Alleman Hall McCoy Russell & Tuttle LLP

(57) ABSTRACT

A control device of a diesel engine is provided. The device includes an engine body having a cylinder, a fuel injection valve for injecting fuel into the cylinder, a valve timing control module for changing opening and closing timings of at least an intake valve or an exhaust valve, an oxidation catalyst arranged within an exhaust passage for purifying HC discharged from the cylinder, and a DPF arranged downstream of the oxidation catalyst for capturing soot within exhaust gas. The device also includes a DPF regenerating module for supplying, when a predetermined DPF regeneration condition is satisfied, HC to the oxidation catalyst to regenerate the DPF by heat generated from an oxidation reaction of HC, and a fuel cutting module for stopping, when the diesel engine is in a deceleration state, a main injection of the fuel that is performed on a compression stroke of the cylinder.

7 Claims, 6 Drawing Sheets

CONTROL DEVICE OF DIESEL ENGINE

BACKGROUND

The present invention related to a field of art relating to a control device of a diesel engine.

Conventionally, diesel engines provided with a diesel particulate filter (hereinafter, referred to as the "DPF") in an exhaust passage have been well known. The DPF captures particulate matters (PM) within the exhaust gas, and when an accumulation amount of the particulate matters increases, it needs to be regenerated. Normally, on the upstream side of such DPF, an oxidation catalyst is provided and a catalyst therein is used in the DPF regeneration. For example, JP2004-0316441A discloses a diesel engine that performs a main injection in which fuel for generating torque is injected into a cylinder, and then a post injection to introduce uncombusted fuel to an exhaust passage. When the uncombusted fuel reaches the catalyst, it is oxidized and increases an exhaust gas temperature. As a result, the PM accumulated in the DPF is combusted to be removed by a high temperature exhaust gas. Thus, the DPF is regenerated.

Meanwhile, when the engine is in a deceleration state, normally, the fuel injection to a cylinder on compression stroke (main injection) is prohibited (because a fuel cut is performed), and therefore, the temperature of the exhaust gas to be supplied to the oxidation catalyst significantly decreases, causing difficulty in maintaining the oxidation catalyst in an activated state. Therefore, even if the post injection is performed to regenerate the DPF, the injected uncombusted fuel will not be oxidized, and thus, an exhaust gas temperature increasing effect using heat from the oxidation reaction is lost and it takes time to regenerate the DPF, causing a degradation in fuel consumption and problems that a larger amount of fuel adheres on an in-cylinder wall face because the post injection and engine oil is diluted.

SUMMARY

The present invention is made in view of the above situations, shortens a period of time of regenerating a DPF of a diesel engine while decelerating, and further suppresses degradation of fuel consumption of the engine and dilution of the engine oil by devising a configuration of a control device of the diesel engine.

According to one aspect of the invention, a control device of a diesel engine including an engine body having a cylinder to which fuel containing diesel fuel as its main component is supplied, a fuel injection valve for injecting the fuel into the cylinder, a valve timing control module for changing opening and closing timings of at least one of an intake valve and an exhaust valve provided to the cylinder, an oxidation catalyst arranged within an exhaust passage connected with the engine body for purifying HC discharged from the cylinder, and a DPF arranged downstream of the oxidation catalyst for capturing soot contained within exhaust gas is provided. The device includes a DPF regenerating module for supplying, when a predetermined DPF regeneration condition is satisfied, HC to the oxidation catalyst to regenerate the DPF by heat generated from an oxidation reaction of HC, and a fuel cutting module for stopping, when the diesel engine is in a deceleration state, a main injection of the fuel that is performed on a compression stroke of the cylinder. In a regeneration-in-deceleration state in which the diesel engine is in the deceleration state and the DPF regeneration condition is satisfied, the valve timing control module performs either one of an open-twice control of opening the intake valve on the intake stroke the exhaust valve on the exhaust valve, and additionally, the exhaust valve on the intake stroke or the intake valve on the exhaust stroke, and a negative overlapping control of setting a period of time in which the intake valve and the exhaust valve are both opened on the exhaust stroke or the intake stroke.

According to this configuration, when the engine is in the deceleration state and the predetermined DPF regeneration condition is satisfied (the engine is in a regeneration-in-deceleration state), uncombusted fuel (HC) is supplied to the oxidation catalyst by the DPF regenerating module, and the DPF regeneration is performed (PM accumulated in the DPF is combusted) by the heat generated from the oxidation reaction.

However, in the regeneration-in-deceleration state, because the main injection of the fuel is prohibited by the fuel cutting module (because the fuel is cut), the temperature of the exhaust gas to be discharged from the cylinder of the engine body does not increase sufficiently. Therefore, the temperature of the exhaust gas to be supplied to the oxidation catalyst and the DPF decreases, causing a problem that a period of time for regenerating the DPF becomes long (a period of time required in combusting PM accumulated in the DPF to be removed therefrom).

Thus, according to the present invention, in the regeneration-in-deceleration state, the open-twice control of the exhaust valve or the intake valve, or the negative overlap control of setting the time period in which the intake valve and the exhaust valve are both closed on the exhaust stroke or the intake stroke is performed. In this manner, a flow amount of fresh air (low temperature air) to flow into the cylinder on the intake stroke can be reduced, and thus, an in-cylinder temperature decrease after the fuel cut can be suppressed as much as possible.

Thus, in the open-twice control of the intake valve, when the intake valve is opened on the exhaust stroke and a part of the combusted gas inside the cylinder is recirculated back to the intake system, the recirculated combusted gas flows into the cylinder on the following intake stroke; therefore, the flow amount of fresh air that flows into the cylinder on the intake stroke reduces accordingly. Further, in the open-twice control of the exhaust valve, the combusted gas discharged to the exhaust system on the exhaust stroke is recirculated back into the cylinder when the exhaust valve is opened on the following intake stroke; therefore, the flow amount of fresh air that flows into the cylinder on the intake stroke reduces accordingly. Further, in the negative overlap control, there exists a time period in which both the intake and exhaust valves close on the intake stroke or the exhaust stroke; therefore, combusted gas remains in the cylinder, and the flow amount of fresh air that flows into the cylinder on the intake stroke reduces accordingly.

Therefore, even after the fuel cut is performed (the main injection is stopped) because the engine is in the regeneration-in-deceleration state, the in-cylinder temperature is kept high, and the temperature of the exhaust gas to be supplied to the DPF from the cylinder can be kept high. Thus, the DPF regenerating time period when the engine is in the deceleration state is shortened to improve a fuel consumption of the engine and to suppress dilution of the engine oil.

The DPF regenerating module may perform a post injection on expansion stroke of the cylinder to supply HC into the exhaust gas to be supplied to the oxidation catalyst, and even when the diesel engine is in the regeneration-in-deceleration state, the DPF regenerating module may prohibit the post injection when a temperature of the oxidation catalyst is below a predetermined temperature. In the regeneration-indeceleration state, while the post injection by the DPF regenerating module is performed, the valve timing control module may prohibit the open-twice control and the negative overlapping control, and while the post injection by the DPF regenerating module is prohibited, the valve timing control module may perform either one of the open-twice control and the negative overlapping control.

According to this configuration, even when the diesel engine is in the regeneration-in-deceleration state, if the temperature of the oxidation catalyst is below a predetermined temperature (e.g., an activating temperature), the post injection by the DPF regenerating module is prohibited. Therefore, for example, the post injection is performed even when the oxidation catalyst is in the deactivated state (the temperature of the oxidation catalyst falls below the activating temperature), and unnecessary consumption of the fuel can be prevented. Moreover, when the post injection by the DPF regenerating module is prohibited, alternative to the post injection, the open-twice control or the negative overlap control is performed by the valve timing controlling module. In this manner, even after the post injection is prohibited and the heat from the oxidation reaction at the oxidation catalyst cannot be obtained, by keeping the in-cylinder temperature high, the temperature decrease of the exhaust gas to be supplied to the DPF can be suppressed. Accordingly, even after the post injection is prohibited, the DPF regeneration can continue. Thus, the DPF regeneration can surely be performed while preventing unnecessary consumption of the fuel by the post injection.

On the other hand, when the temperature of the oxidation catalyst is above the predetermined temperature in the regeneration-in-deceleration state, the post injection by the DPF regenerating module is performed, and thereby, the DPF regeneration can surely be performed by using the heat from the oxidation reaction of uncombusted fuel (HC) at the oxidation catalyst. Further, while the post injection is performed by the DPF regenerating module, the open-twice control and the negative overlap control by the valve timing controlling module is prohibited. In this manner, uncombusted fuel being recirculated back into the cylinder and being incompletely combusted (generating a torque) can be prevented. Thus, a degradation of the engine brake performance when the engine decelerates does not occur.

The DPF regenerating module may perform a post injection on expansion stroke of the cylinder to supply HC into the exhaust gas to be supplied to the oxidation catalyst, and even when the diesel engine is in the regeneration-in-deceleration state, the DPF regenerating module may prohibit the post injection after a predetermined period of time passes from the start of the engine deceleration. In the regeneration-in-deceleration state, while the post injection by the DPF regenerating module is performed, the valve timing control module may prohibit the open-twice control and the negative overlapping control, and while the post injection by the DPF regenerating module is prohibited, the valve timing control module may perform either one of the open-twice control and the negative overlapping control.

According to this configuration, even when the diesel engine is in the regeneration-in-deceleration state, for the predetermined time period from the start of the deceleration of the engine, the post injection by the DPF regenerating module is performed. Moreover, while the post injection is performed by the DPF regenerating module, the open-twice control by the valve timing control module is prohibited.

On the other hand, when the diesel engine is in the regeneration-in-deceleration state, after the predetermined time period passed from the start of the deceleration of the engine, the post injection by the DPF regenerating module is prohibited. Moreover, while the post injection by the DPF regenerating module is prohibited, alternative to the post injection, the open-twice control or the negative overlap control is performed by the valve timing control module.

Moreover, the predetermined time period is predetermined as a period of time from the start of the deceleration of the engine until the temperature of the oxidation catalyst falls below the activating temperature. In this manner, the operations and effects similar to the above aspect can easily be obtained by a timer control.

The control device in the above aspect may also include a throttle valve arranged within an intake passage connected with the engine body, and a throttle valve control module for controlling an opening of the throttle valve, the throttle valve control module controlling, when the diesel engine is in the deceleration state, the throttle valve to throttle to the extent smaller than the opening of the throttle valve when the diesel engine is not in the deceleration state.

According to this configuration, when the engine is in the deceleration state, the throttle valve arranged within the intake passage of the engine is controlled to be throttled to have a smaller opening by the throttle valve control module. In this manner, the flow amount of fresh air that flows into the cylinder when the engine is in the deceleration state is suppressed, and the temperature decrease inside the cylinder after the fuel cut (the main injection is stopped) can be suppressed as much as possible. Thus, even after the fuel cut is performed, the temperature of the exhaust gas to be supplied to the oxidation catalyst and the DPF from the cylinder can be kept high, and the DPF regenerating time period when the engine is in the deceleration state can further surely be shortened.

When the engine is in the deceleration state, the DPF regenerating module may advance a timing of the post injection performed when the DPF regeneration condition is satisfied, compared to when the engine is in a constant speed state or an acceleration state.

According to this configuration, the dilution of the engine oil can further surely be suppressed. Because the post injection is for supplying uncombusted fuel to the exhaust system, its injection timing is preferably in the late stage of the expansion stroke where the in-cylinder temperature is low. However, when the engine is in the deceleration state, the in-cylinder temperature significantly decreases due to the fuel cut, and therefore, if the post injection is performed in the late stage of the expansion stroke, uncombusted fuel adhered to an in-cylinder wall face does not vaporize and remain in the form of liquid. As a result, a problem arises that the uncombusted fuel adhered to the in-cylinder wall face is diluted. On the other hand, in the present invention, the timing of the post injection performed when the engine is in the deceleration state is advanced from the timing of the post injection performed in a constant speed state or an acceleration state of the engine. Thus, the vaporization of the uncombusted fuel adhered to the in-cylinder wall face is stimulated, and the above described problem of the dilution of the engine oil can be avoided as much as possible.

DETAILED DESCRIPTION OF THE EMBODIMENTS

Hereinafter, a diesel engine according to one embodiment of the present invention is described in detail with reference to the appended drawings. Note that, the following description of the suitable embodiment is merely an illustration.

Figure 1:
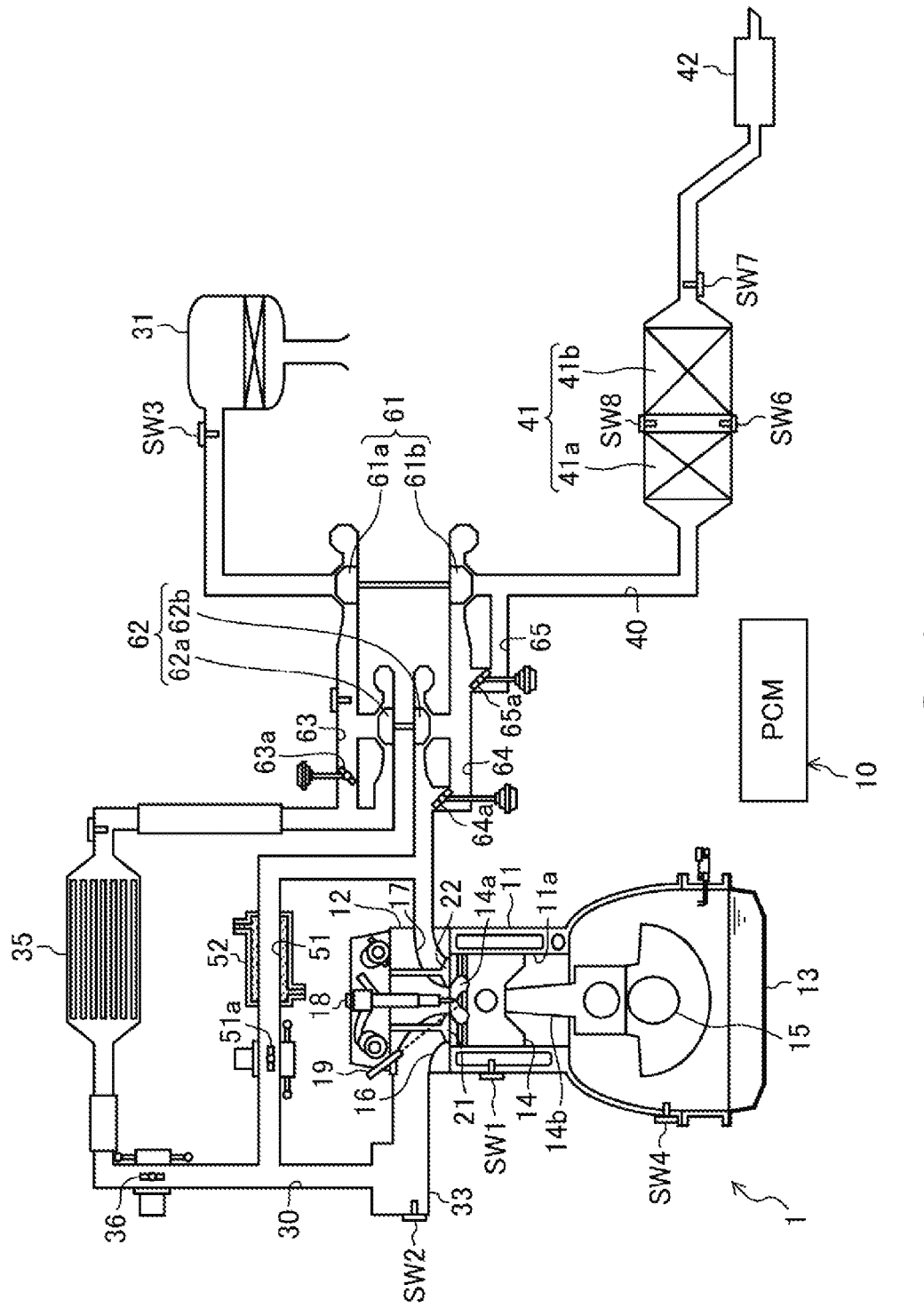
FIG. 1 is a schematic diagram illustrating a diesel engine provided with a control device according to one embodiment of the invention.

FIG. 1 is a schematic configuration of an engine 1 (engine body) according to the embodiment. The engine 1 is a diesel engine installed in a vehicle to which fuel containing diesel fuel as its main component is supplied. The engine 1 includes a cylinder block 11 formed with a plurality of cylinders 11a (only one cylinder is illustrated), a cylinder head 12 arranged on the cylinder block 11, and an oil pan 13 arranged below the cylinder block 11 where a lubricant is stored. Inside each cylinder 11a of the engine 1, a piston 14 is reciprocatably fitted, and a cavity partitioning a reentrant-shaped combustion chamber 14a is formed on a top face of the piston 14. The piston 14 is coupled to a crank shaft 15 via a connecting rod 14b.

In the cylinder head 12, an intake port 16 and an exhaust port 17 are formed, and an intake valve 21 for opening and closing the opening of the intake port 16 on the combustion chamber side and an exhaust valve 22 for opening and closing the opening of the exhaust port 17 on the combustion chamber 14a side are arranged for each cylinder 11a.

Figure 2:
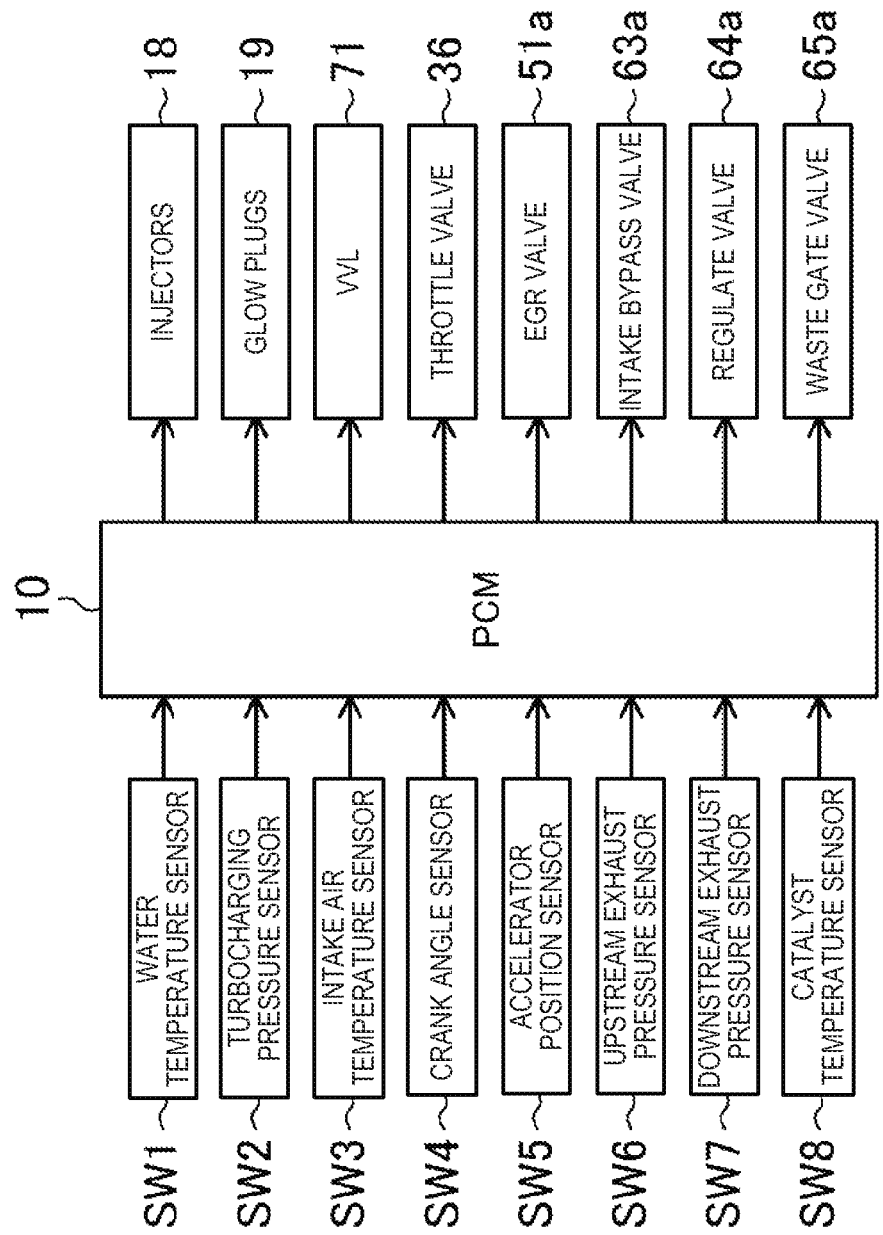
FIG. 2 is a block diagram relating a control of the diesel engine.

Within a valve train system of the engine 1 for operating the intake and exhaust valves 21 and 22, a hydraulically-actuated variable valve mechanism (see, FIG. 2, hereinafter, referred to as a VVL (Variable Valve Lift and timing)) 71 for enabling a changing of open-and-close timings of the exhaust valve 22 is provided on an exhaust valve side.

The VVL 71 (a detailed configuration is not illustrated) is configured to include two kinds of cams with cam profiles different from each other in which a first cam has one cam nose and a second cam has two cam noses; and a lost motion mechanism for selectively transmitting an operation state of either one of the first and second cams to the exhaust valve. When the lost motion mechanism transmits the rotating operation of the first cam to the exhaust valve 22, the exhaust valve 22 opens only once during exhaust stroke. On the other hand, when the lost motion mechanism transmits the rotating operation of the second cam to the exhaust valve 22, the exhaust valve 22 opens during the exhaust stroke and also during the intake stroke once each (exhaust open-twice control). In the following description, "the VVL 71 is in the activated state" indicates a state where the open-twice control of the exhaust valve 22 is performed by the first cam, and "the VVL 71 is in the deactivated state" indicates a state where the exhaust open-twice control is not performed, in other words, the exhaust valve 22 is opened only once during the exhaust stroke by the second cam.

The activation and deactivation of the VVL 71 is switched therebetween by a hydraulic pressure supplied from a hydraulic pressure pump operated by the engine (not illustrated), and an internal EGR becomes available by activating the VVL 71. Note that, an electromagnetically-operated valve system for operating the exhaust valve 22 by using an electromagnetic actuator may be adopted in enabling the switch between the activation and deactivation of the VVL. Further, the execution of the internal EGR is not limited to the exhaust open-twice control, and it may be accomplished through, for example, an internal EGR control by opening the intake valve 21 twice on the intake stroke and the exhaust stroke (intake open-twice control) or through an internal EGR control by leaving combusted gas inside the cylinder (11a) by setting a negative overlap period in which both of the intake and exhaust valves 21 and 22 are closed during the exhaust stroke or the intake stroke.

The cylinder head 12 is provided with injectors 18 for injecting the fuel, and glow plugs 19 for improving ignitability of the fuel by warming up intake air in a cold state of the engine 1. Each injector 18 is arranged so that its fuel injection port is exposed within the combustion chamber 14a from a ceiling surface of the combustion chamber 14a, and it directly supplies the fuel to the combustion chamber 14a by injection basically when the piston is near a top dead center (TDC) on the compression stroke.

An intake passage 30 is connected on one side face of the engine 1 so as to communicate with the intake ports 16 of the cylinders 11a. On the other hand, an exhaust passage 40 through which combusted gas (exhaust gas) from each cylinder 11a is discharged is connected on the other side face of the engine 1. The intake and exhaust passages 30 and 40 are arranged with a large turbocharger 61 and a small turbocharger 62 for turbocharging the intake air (described later in details).

An air cleaner 31 for filtering intake air is arranged in an upstream end part of the intake passage 30. A surge tank 33 is arranged near a downstream end of the intake passage 30. A part of the intake passage 30 downstream of the surge tank 33 is branched toward the respective cylinders 11a to be independent passages, and downstream ends of the independent passages are connected with the intake ports 16 of the cylinders 11a, respectively.

A compressor 61a of the large turbocharger 61, a compressor 62a of the small turbocharger 62, an intercooler 35 for cooling air compressed by the compressors 61a and 62a, and a throttle valve 36 for adjusting an intake air amount for each combustion chamber 14a of the cylinder 11a are arranged between the air cleaner 31 and the surge tank 33 in the intake passage 30. The throttle valve 36 is basically fully opened; however, it is fully closed when the engine 1 is stopped to avoid a shock.

An upstream part of the exhaust passage 40 is constituted with an exhaust manifold having independent passages branched toward the cylinders 11a respectively, and connected with outer ends of the exhaust ports 17, and a merging section where the independent passages merge together.

In a part of the exhaust passage 40 downstream of the exhaust manifold, a turbine 62b of the small turbocharger 62, a turbine 61b of the large turbocharger 61, an exhaust emission control system 41 for purifying hazardous components contained in the exhaust gas, and a silencer 42 are arranged from its upstream side in this order.

The exhaust emission control system 41 includes the oxidation catalyst 41a and a DPF 41b arranged from its upstream side in this order. The oxidation catalyst 41a and the DPF 41b are accommodated in a single case. The oxidation catalyst 41a has an oxidation catalyst carrying, for example, only platinum or platinum added with palladium, and stimulates a reaction of oxidizing CO and HC contained within the exhaust gas to generate $CO_2$ and $H_2O$. The oxidation catalyst 41a configures a catalyst having an oxidation function. Further, the DPF 41b is a filter that captures PM, such as soot, which is contained in the exhaust gas of the engine 1, for example, the DPF 41b is a wall flow type filter formed with heat resistant ceramic material such as silicon carbide (SiC) or cordierite, or a three-dimensional net filter formed with a heat resistant ceramic fiber. Note that, the oxidation catalyst may be coated on the DPF 41b.

An EGR passage 51 for re-circulating a part of the exhaust gas to the intake passage 30 connects a part of the intake passage 30 between the surge tank 33 and the throttle valve 36 (i.e., the part of the intake passage 30 downstream of the small compressor 62a of the small turbocharger 62) with a part of the exhaust passage 40 between the exhaust manifold and the small turbine 62b of the small turbocharger 62 (i.e., the part of the exhaust passage 40 upstream of the small compressor 62a of the small turbocharger 62). The EGR passage 51 is arranged with an EGR valve 51a for adjusting a re-circulating amount of the exhaust gas to the intake passage 30 and an EGR cooler 52 for cooling the exhaust gas by the engine coolant.

The large turbocharger 61 has the large compressor 61a arranged in the intake passage 30 and the large turbine 61b arranged in the exhaust passage 40. The large compressor 61a is arranged in the intake passage 30 between the air cleaner 31 and the intercooler 35. On the other hand, the large turbine 61b is arranged in the exhaust passage 40 between the exhaust manifold and the oxidation catalyst 41a.

The small turbocharger 62 has the small compressor 62a arranged in the intake passage 30 and the small turbine 62b arranged in the exhaust passage 40. The small compressor 62a is arranged in the intake passage 30 downstream of the large compressor 61a. On the other hand, the small turbine 62b is arranged in the exhaust passage 40 upstream of the large turbine 61b.

Thus, the large compressor 61a and the small compressor 62a are aligned in the intake passage 30 in this order from the upstream side, and the small turbine 62b and the large turbine 61b are aligned in the exhaust passage 40 in this order from the upstream side. These large and small turbines 61b and 62b are rotated by an exhaust gas flow, and the large and small compressors 61a and 62a respectively coupled to the large and small turbines 61b and 62b are operated by the rotations of these large and small turbines 61b and 62b.

The small turbocharger 62 is relatively small, and the large turbocharger 61 is relatively large. Thus, the large turbine 61b of the large turbocharger 61 has a larger inertia than the small turbine 62b of the small turbocharger 62.

Further, a small intake bypass passage 63 for bypassing the small compressor 62a is connected with the intake passage 30. This small intake bypass passage 63 is arranged with a small intake bypass valve 63a for adjusting an air amount that flows into the small intake bypass passage 63. The small intake bypass valve 63a is configured to be fully closed (normally closed) when there is no power distribution.

On the other hand, the exhaust passage 40 is connected with a small exhaust bypass passage 64 for bypassing the small turbine 62b and with a large exhaust bypass passage 65 for bypassing the large turbine 61b. The small exhaust bypass passage 64 is arranged with a regulate valve (R/V) 64a for adjusting an amount of the exhaust gas that flows into the small exhaust bypass passage 64, and the large exhaust bypass passage 65 is arranged with a waste gate valve (WG/G) 65a for adjusting an amount of the exhaust gas that flows into the large exhaust bypass passage 65. The regulate valve 64a and the waste gate valve 65a are both configured to be fully opened (normally opened) when there is no power distribution.

The control device of the diesel engine 1 configured as above includes a power train control module (hereinafter referred to as the PCM) 10. The PCM 10 is configured by a microprocessor having a CPU, a memory, a set of counter timers, an interface, and a pass for connecting these units. As illustrated in FIG. 2, the PCM 10 is inputted with detection signals of the water temperature sensor SW1 for detecting the temperature of the engine coolant, a turbocharging pressure sensor SW2 attached to the surge tank 33 and for detecting pressure of the air to be supplied into the combustion chambers 14a, an intake air temperature sensor SW3 for detecting the temperature of the intake air, a crank angle sensor SW4 for detecting a rotational angle of the crankshaft 15, an accelerator position sensor SW5 for detecting an accelerator opening corresponding to an angle of an acceleration pedal (not illustrated) of the vehicle, an upstream exhaust pressure sensor SW6 for detecting an exhaust gas pressure on the upstream of the DPF 41b, a downstream exhaust pressure sensor SW7 for detecting the exhaust gas pressure downstream of the DPF 41b, and a catalyst temperature sensor SW8 for detecting the temperature of the oxidation catalyst 41a. By performing various kinds of operations based on these detection signals, the PCM 10 determines states of the engine 1 and the vehicle, and further outputs control signals to the injectors 18, the glow plugs 19, the VVL 71 in the valve train system, and operation actuators of the various kinds of valves 36, 51a, 63a, 64a, and 65a according to the determined states.

The engine 1 is configured to have a comparatively low geometric compression ratio of between 12:1 and 15:1 so as to improve an exhaust emission performance and a thermal efficiency. On the other hand, with the engine 1, the large and small turbochargers 61 and 62 increase the torque, and thereby, the reduced torque due to the lowered geometric compression ratio is compensated.

Outline of Engine Control

As a basic control of the engine 1, the PCM 10 determines a target torque (target load) based mainly on an engine speed and the accelerator opening, and performs a fuel injection by the injector 18 when the piston is near the compression TDC so as to generate the target torque. Note that, when the engine 1 is in deceleration, the PCM 10 performs a fuel cutting control of stopping (prohibiting) the main injection when the piston is near the compression TDC.

Moreover, when a DPF regeneration condition is satisfied, the PCM 10 performs a post injection that does not contribute in the combustion (does not generate torque) to be caused by the injector 18 when the cylinder 11a is on the expansion stroke. The post injected fuel is supplied to the oxidation catalyst 41a along with the exhaust gas to be oxidized. The heat generated by this oxidation increases the temperature of the exhaust gas supplied to the DPF 41b, and the exhaust particulates accumulated in the DPF 41b are removed by being combusted using the heat of the exhaust gas. Thus, the DPF 41b is regenerated.

Here, the DPF regeneration condition is a predetermined condition with which it is determined that the DPF 41b is required to be regenerated. In this embodiment, an accumulation amount of PM in the DPF 41b is evaluated (estimated) by a difference ΔP in exhaust gas pressure on the upstream side and the downstream side in the DPF 41b, and when the difference in pressure ΔP is above a predetermined value X, the regeneration condition of the DPF 41b is determined to be satisfied. The DPF regeneration ends when the difference in pressure ΔP falls below a predetermined minimum value Y smaller than the predetermined value X. Thus, when a PM accumulation amount M in the DPF 41b is above the predetermined value X and the DPF regeneration control is started, even if the PM accumulation amount becomes below the predetermined value X thereafter, as long as it does not become below the minimum value Y, the DPF regeneration condition is considered as being satisfied and the control continues.

In this embodiment, the DPF regeneration control by the PCM 10 includes a normal regeneration control performed when the engine 1 is in an acceleration state or a constant speed state and a regeneration-in-deceleration control performed when the engine 1 is in a deceleration state. Thus, the PCM 10 performs the regeneration-in-deceleration control when a filter regeneration condition is determined to be satisfied while the engine 1 is in the deceleration state, and on the other hand, it performs the normal regeneration control when the filter regeneration condition is determined to be satisfied while the engine 1 is in the acceleration state or the constant speed state.

In the normal regeneration control, a timing of the post injection is set to be between 80° to 120° ATDC, and the post injection is referred to as a normal post injection in the following description.

On the other hand, in the regeneration-in-deceleration control, the exhaust open-twice control is performed by the VVL 71 in addition to performing the post injection of the fuel. The post injection timing is advanced compared to the timing of the normal post injection, and in this embodiment, it is set between 30° to 40° ATDC.

Figure 3A:
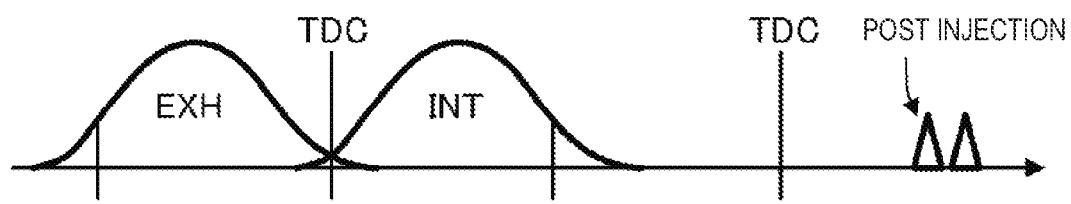
FIGS. 3A and 3B are charts of timings of a post injection and opening an exhaust valve schematically illustrating contents of a regeneration-in-deceleration control by a PCM.
Figure 3B:
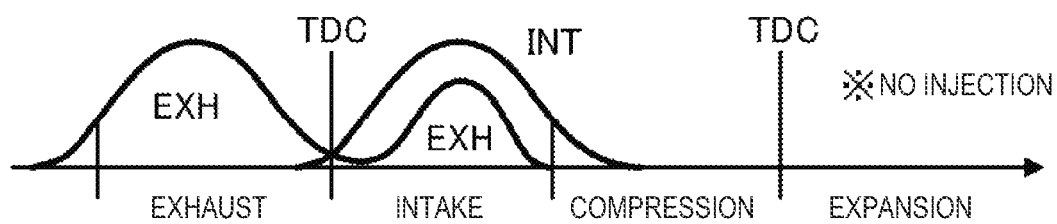

In the regeneration-in-deceleration control, the post injection and the exhaust open-twice control are performed at predetermined timings, respectively, based on a timer control. Specifically, for a predetermined period of time Lt from the start of the deceleration of the engine 1, as illustrated in FIG. 3A, the post injection is performed but the exhaust open-twice control by the VVL 71 is prohibited, and on the other hand, after the predetermined time period Lt passes, as illustrated in FIG. 3B, the post injection by the injector 18 is prohibited but the exhaust open-twice control by the VVL 71 is performed. The predetermined time period Lt is stored, as a period of time from the start of the deceleration of the engine 1 until the temperature of the oxidation catalyst 41a falls below an activating temperature, in the ROM in the form of a map in association with a relation between the engine torque and the engine speed.

Further, the PCM 10 controls the openings of the throttle valve 36 and the EGR valve 51a according to the operation state of the engine 1. Specifically, the PCM 10 controls the throttle valve 36 to be fully opened while the regeneration-in-deceleration control is not performed, and on the other hand, the PCM 10 performs a throttle control to control to throttle the opening of the throttle valve 36 to be relatively smaller while the regeneration-in-deceleration control is performed. The throttled opening of the throttle valve 36 is set to be close to fully closed within the range where the engine 1 does not stop. The throttled opening is stored in the ROM in the form of a map in association with a relation between the engine speed and the engine torque.

Further, when the post injection by the injector 18 is not performed, the PCM 10 calculates a target EGR ratio according to the operation state of the engine 1, and controls the opening of the EGR valve 51a to obtain the target EGR ratio. On the other hand, when the post injection by the injector 18 is performed, the PCM 10 controls the EGR valve 51a to the fully closed state.

Figure 4:
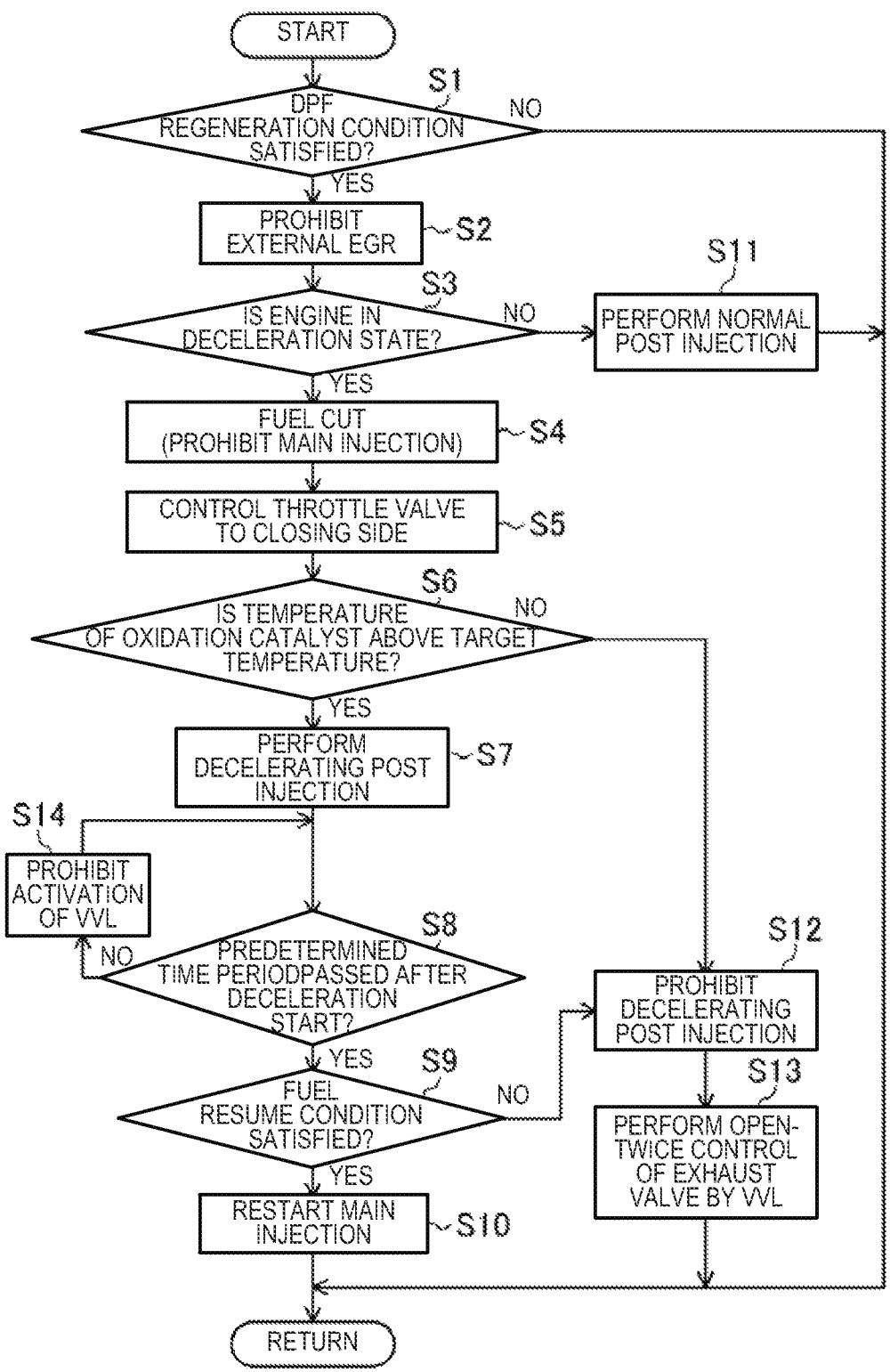
FIG. 4 is a flowchart illustrating a DPF regeneration control by the PCM.

Next, the DPF regeneration control by the PCM 10 is described in detail based on the flowchart in FIG. 4.

At Step S1, it is first determined whether the DPF regeneration condition is satisfied, and when the result is NO, the determination is repeated, and when the result is YES, it proceeds to Step S2.

At Step S2, a control signal is outputted to the operation actuator of the EGR valve 51a to fully close the EGR passage 51 (to prohibit an external EGR).

As Step S3, it is determined whether the engine 1 is in the deceleration state based on the signals from the crank angel sensor SW4 (engine speed sensor) and the accelerator opening sensor SW5, and when the result is NO, it proceeds to Step S11, and when the result is YES, it proceeds to Step S4.

At Step S4, the control signal is outputted to the injector 18 to stop the main injection so that the fuel cutting control is performed.

At Step S5, the control signal is outputted to the operation actuator of the throttle valve 36 to perform the throttle control of the throttle valve 36 so that the throttle valve 36 is controlled to an opening close to fully closed.

At Step S6, it is determined whether the temperature of the oxidation catalyst 41a is above a target temperature (e.g., activating temperature) based on the signal from the catalyst temperature sensor SW9, when the result is NO, it proceeds to Step S12, and when the result is YES, it proceeds to Step S7.

At Step S7, the control signal is outputted to the injector 18 to perform the post injection in the regeneration-in-deceleration control (decelerating post injection).

At Step S8, it is determined whether the predetermined time period Lt has passed after the engine 1 starts to decelerate, when the result is NO, it proceeds to Step S14, and when the result is YES, it proceeds to Step S9.

At Step S9, it is determined whether a fuel resume condition is satisfied, when the result is NO, it proceeds to Step S12, and when the result is YES, it proceeds to Step S10. Specifically, in this embodiment, the fuel resume condition is determined to be satisfied when the engine speed is determined to be below a predetermined idle engine speed based on the signal from the crank angle sensor SW4.

At Step S10, the control signal is outputted to the injector 18 to restart the main injection of the fuel, and it returns to Step S1 thereafter.

At Step S11 consecutive to Step S3 when the determination at Step S3 is NO, the control signal is outputted to the injector 18 to perform the normal post injection.

At Step S12 consecutive to Steps S6 and S9 when the determination at Step S6 or S9 is NO, the decelerating post injection is prohibited.

At Step S13, the VVL 71 is activated to perform the open-twice control of the exhaust valve 22, and it returns to Step S1 thereafter.

At Step S14 consecutive to Step S8 when the determination at Step S8 is NO, The activation of the VVL 71 is prohibited, and it returns to Step S8 thereafter.

Figure 5:
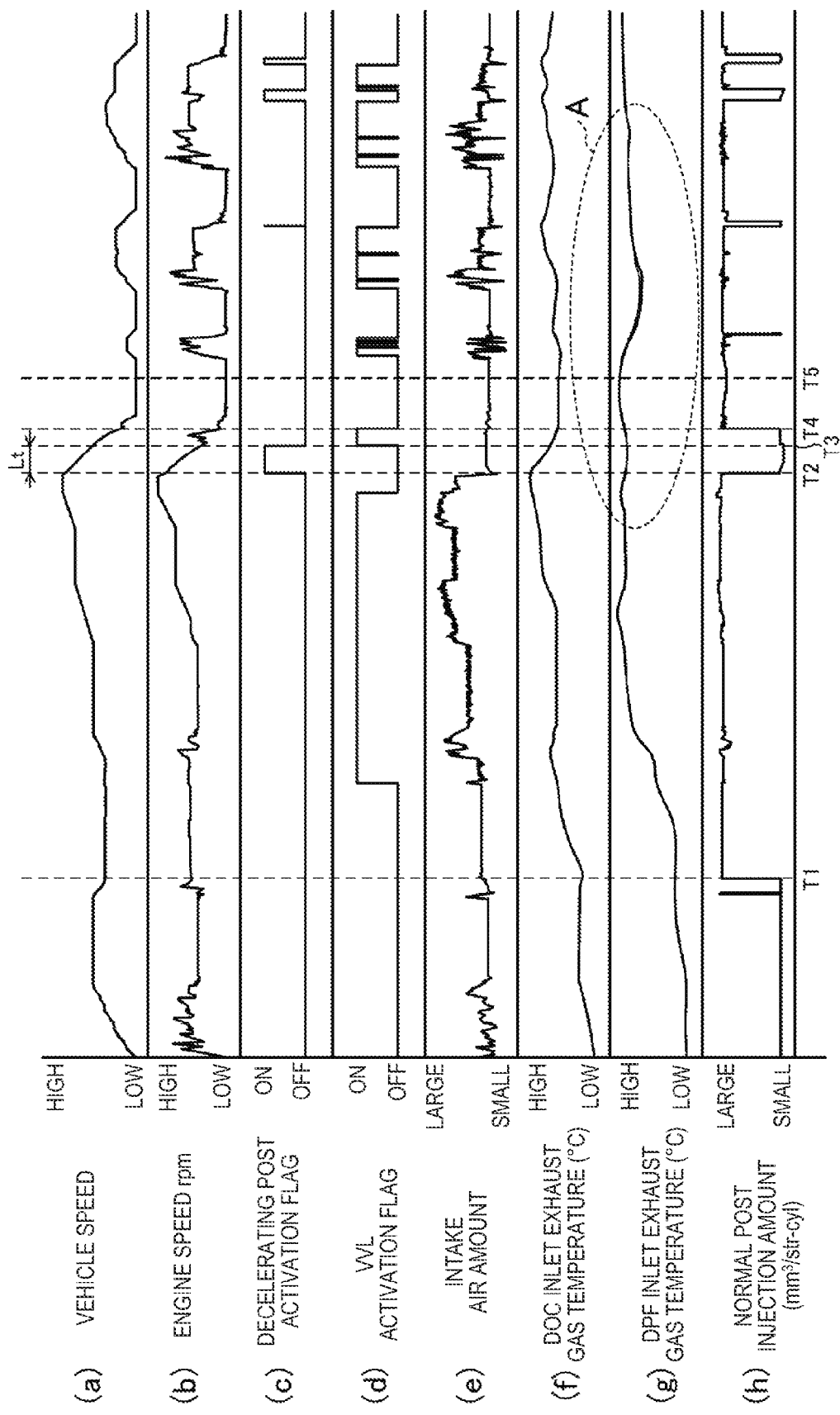
FIG. 5 illustrates time charts of a specific example of the DPF regeneration control, in which the chart (a) indicates a vehicle speed, the chart (b) indicates an engine speed, the chart (c) indicates a decelerating post flag, the chart (d) indicates a VVL activation flag, the chart (e) indicates an intake air amount, the chart (f) indicates a DOC inlet exhaust gas temperature, the chart (g) indicates a DPF inlet exhaust gas temperature, and the chart (h) indicates a normal post injection amount.

FIG. 5 illustrates time charts of a specific example of the DPF regeneration control, in which the chart (a) indicates the vehicle speed (km/h), the chart (b) indicates the engine speed (rpm), the chart (c) indicates a decelerating post flag, the chart (d) indicates a VVL activation flag, the chart (e) indicates the intake air amount (mg/cyl), the chart (f) indicates the exhaust gas temperature at the inlet of the oxidation catalyst 41a (hereinafter, referred to as "the DOC inlet exhaust gas temperature) (° C.), the chart (g) indicates the exhaust gas temperature at the inlet of the DPF 41b (hereinafter, referred to as "the DPF inlet exhaust gas temperature) (° C.), and the chart (h) indicates a normal post injection amount (mm³/st). The decelerating post flag is a flag for determining whether to perform the post injection when the engine 1 is in the deceleration state, and the VVL activation flag is a flag for determining whether to activate the VVL 71.

Figure 6:
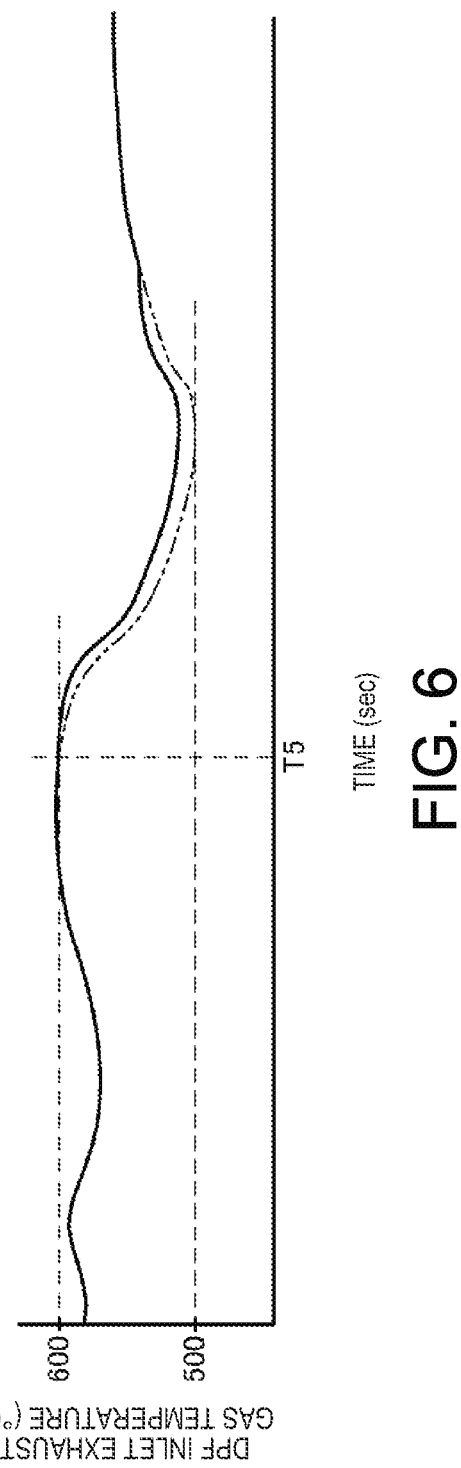
FIG. 6 is an enlarged chart of the area A in chart (g) of FIG. 5.

At time points T1 and T2, because the engine 1 is in the constant speed state or the acceleration state, the normal regeneration control is performed by the PCM 10, and the normal post injection is performed by the injector 18 (see the chart (h) in FIG. 5). At time points T2 to T4, because the engine 1 is in the deceleration state, the regeneration-in-deceleration control is performed by the PCM 10. Specifically, first at the time point T2, the engine 1 shifts to the deceleration state and the throttle valve 36 is controlled to have a smaller opening by the PCM 10, and accordingly, the intake air amount is rapidly reduced (see the chart (e) in FIG. 5). Moreover, at the time point T2, the decelerating post flag is turned on and the decelerating post injection starts (the chart (c) in FIG. 5). The decelerating post injection is performed until the time point T3 that is after the predetermined time period Lt from the time point T2. At the time point T3, the VVL activation flag is turned on, and the exhaust open-twice control by the VVL 71 is performed (see the chart (d) in FIG. 5). Further, at the time point T4, because the deceleration state ends, the VVL 71 stops the exhaust open-twice control. The DOC inlet exhaust gas temperature starts to decrease along with the shifting of the operation state of the engine 1 to the deceleration state (see the chart (f) in FIG. 5) as the fuel cutting control is performed by the PCM 10 in the deceleration state of the engine 1 and the temperature inside the cylinder 11a decreases. The DPF inlet exhaust gas temperature starts to decrease at the time point T5 after the decrease of the DOC inlet exhaust gas temperature (see the chart (g) in FIG. 5). FIG. 6 is an enlarged chart of the area of the chart (g) in FIG. 5 where the temperature starts to decrease. The solid line in the chart indicates a case where the VVL 71 is activated in the regeneration-in-deceleration control (a case where the control device according to this embodiment is used), and the two-dotted chain line indicates a case where the VVL 71 is not activated (the conventional case). According to this, it can be seen that the DPF inlet exhaust gas temperature is higher than in the conventional case by 20° C. This is considered so because the amount of fresh air flowing into the cylinder 11a on the intake stroke is reduced due to the exhaust valve 22 being opened through the activation of the VVL 71, and the decrease in temperature inside the cylinder 11a after the fuel cut (after the time point T2) is suppressed.

In this embodiment as described above, when the engine 1 is in the deceleration state and the DPF regeneration condition is satisfied (regeneration-in-deceleration state), the open-twice control of the exhaust valve 22 by the VVL 71 is performed (Step S13) in addition to the post injection of the cylinder 11a on the expansion stroke (Step S7), and thus, even after the fuel is cut when the engine 1 is in the deceleration state, the temperature of the exhaust gas to be supplied to the DPF 41b is kept high (the temperature inside the cylinder 11a is kept high), and the DPF regeneration can be continued. Thus, the DPF regeneration time period when the engine 1 is in the deceleration state can be shortened, and as a result, the fuel consumption of the engine 1 can be improved, and the oil dilution due to the post injected fuel adhering to the in-cylinder wall face.

Specifically, in this embodiment, for the predetermined time period Lt from the deceleration starting time (Step S8: NO), the PCM 10 performs the decelerating post injection (Step S7), and after the predetermined time period Lt is passed (Step S8: YES), the VVL 71 is activated to perform the exhaust open-twice control instead of prohibiting the decelerating post injection (Steps S12 and S13). Further, in this embodiment, the predetermined time period Lt is set in advance as the time period from the start of the deceleration of the engine 1 until the temperature of the oxidation catalyst 41a falls below the activating temperature.

Therefore, when the catalyst is in the activated state immediately after the deceleration start, by performing the post injection, the DPF 41b can surely be regenerated by using the heat from the oxidation reaction of the fuel by the oxidation catalyst 41a; however, after the oxidation catalyst 41a enters the deactivated state, by activating the VVL 71 to perform the exhaust open-twice control while prohibiting the post injection to suppress the unnecessary post injection, even after the post injection is prohibited, the temperature of the exhaust gas to be supplied to the DPF 41b can be kept high. Thus, the DPF 41b can efficiently be regenerated in a short time while suppressing unnecessary fuel consumption.

Further, in this embodiment, the PCM 10 prohibits the activation of the VVL 71 for the predetermined time period Lt from the deceleration starting time (i.e., while the post injection of the fuel is performed) (Step S14).

In this manner, the post injected fuel can be prevented from being sucked back to the cylinder 11a and incompletely combusted (generating q torque) due to open-twice control of the exhaust valve 22. Therefore, the degradation of the engine brake performance when the engine is in the deceleration state does not occur.

Further, in this embodiment, when the engine 1 is in the deceleration state, the PCM 10 performs the throttle control to control the throttle valve 36 to be throttled to the extent that it is smaller than when the engine 1 is in the acceleration state or the constant speed state (Step S5).

According to this, the flow amount of fresh air to flow into the cylinder 11a (air at low temperature) is reduced when the engine 1 is in the deceleration state, and the decrease in in-cylinder temperature after the fuel cut due to the deceleration start (after the main injection is stopped) can be suppressed. Thus, the temperature of the exhaust gas to be supplied to the DPF from the cylinder 11a when the engine 1 is in the deceleration state is kept high, and thereby, the DPF regeneration time period when the engine 1 is in the deceleration state can surely be further shortened.

Moreover, in this embodiment, the timing of the decelerating post injection is more advanced than the timing of the normal post injection. In this manner, the dilution of the engine oil can surely be further suppressed. Thus, because the post injection is performed to supply the uncombusted fuel to the exhaust system, the injection timing thereof is preferably in the late stage of the expansion stroke where the temperature inside the cylinder 11a is low. However, when the engine 1 is in the deceleration state where the decelerating post injection is performed, because the temperature inside the cylinder 11a is significantly decreased by the fuel cut, if the post injection is performed in the late stage of the expansion stroke, a problem arises that the fuel adhered to the in-cylinder wall face is diluted. On the other hand, in this embodiment, the timing of the decelerating post injection is advanced from the timing of the normal post injection in the early stage of the expansion stroke where the temperature inside the cylinder 11a is comparatively high. Therefore, the above described problem of the dilution of the engine oil can be avoided.

Other Embodiments

The configuration of the present invention is not limited to the above embodiment, and includes other various kinds of configurations.

Thus, in the above embodiment, the PCM 10 varies the timings of performing the decelerating post injection and the exhaust open-twice control; however, not limiting to this, they may be performed at the same timing.

In the above embodiment, it is determined whether the DPF regeneration condition is satisfied based on the difference in pressure $\Delta P$ of the DPF 41b; however, without limiting to this, for example, the PCM 10 may calculate the PM accumulation amount of the DPF 41b based on the history of the operation state of the engine 1, and the DPF regeneration condition may be determined to be satisfied when the calculated accumulation amount exceeds the predetermined amount.

Further, in the above embodiment, the PCM 10 performs the throttle control of the throttle valve 36 when performing the regeneration-in-deceleration control; however, it does not necessarily need to be performed.

The present invention is useful in control devices of diesel engines and is particularly useful in diesel engines including a DPF regenerating module for regenerating a DPF provided in an exhaust passage of the engine.

DESCRIPTION OF REFERENCE NUMERALS

1 Diesel Engine (Engine Body)
10 PCM (Valve Timing Control Module, DPF Regenerating Module, Throttle Valve Control Module, Fuel Cutting Module)
18 Injector
21 Intake Valve
22 Exhaust Valve
36 Throttle Valve
41a Oxidation Catalyst
41b DPF
71 VVL (Valve Timing Control Module)

The invention claimed is:

1. A system for use in a diesel engine including an engine body having a cylinder to which fuel containing diesel fuel as its main component is supplied, an oxidation catalyst arranged within an exhaust passage connected with the engine body for purifying HC discharged from the cylinder, and a DPF arranged downstream of the oxidation catalyst for capturing soot contained within exhaust gas, the system comprising:
    a control device operatively linked to a fuel injection valve for injecting the fuel into the cylinder, and to an intake valve and an exhaust valve provided to the cylinder having respective opening and closing timings, the control device including:
    a valve timing control module executed by a microprocessor for changing the opening and closing timings of at least one of the intake valve and the exhaust valve provided to the cylinder;
    a DPF regenerating module executed by the microprocessor for supplying, when a predetermined DPF regeneration condition is satisfied, HC to the oxidation catalyst to regenerate the DPF by heat generated from an oxidation reaction of HC; and
    a fuel cutting module executed by the microprocessor for stopping, when the diesel engine is in a deceleration state, a main injection of the fuel that is performed on a compression stroke of the cylinder,
    wherein in a regeneration-in-deceleration state in which the diesel engine is in the deceleration state and the DPF regeneration condition is satisfied, the valve timing control module performs either one of:
        a) an open-twice control of opening the intake valve on an intake stroke, the exhaust valve on an exhaust stroke and additionally, the exhaust valve on the intake stroke or the intake valve on the exhaust stroke, or
        b) a negative overlapping control of setting a period of time in which the intake valve and the exhaust valve are both closed on the exhaust stroke or the intake stroke,
    wherein the DPF regenerating module performs a post injection on an expansion stroke of the cylinder to supply HC into the exhaust gas to be supplied to the oxidation catalyst, and, even when the diesel engine is in the regeneration-in-deceleration state, the DPF regenerating module prohibits the post injection when a temperature of the oxidation catalyst is below a predetermined temperature, and
    wherein in the regeneration-in-deceleration state, while the post injection by the DPF regenerating module is performed, the valve timing control module prohibits the open-twice control and the negative overlapping control, and while the post injection by the DPF regenerating module is prohibited, the valve timing control module performs either one of the open-twice control or the negative overlapping control.

2. The system of claim 1, wherein when the engine is in the deceleration state, the DPF regenerating module advances a timing of the post injection performed when the DPF regeneration condition is satisfied, compared to when the engine is in a constant speed state or an acceleration state.

3. The system of claim 1, wherein in the regeneration-in-deceleration state, the DPF regenerating module prohibits the post injection after a predetermined period of time passes from a start of the engine deceleration.

4. The system of claim 3, further comprising:
    a throttle valve arranged within an intake passage connected with the engine body; and
    a throttle valve control module for controlling an opening of the throttle valve, the throttle valve control module controlling, when the diesel engine is in the deceleration state, the throttle valve to be throttled to an extent smaller than the opening of the throttle valve when the diesel engine is not in the deceleration state.

5. The system of claim 3, wherein when the engine is in the deceleration state, the DPF regenerating module advances a timing of the post injection performed when the DPF regeneration condition is satisfied, compared to when the engine is in a constant speed state or an acceleration state.

6. The system of claim 1, further comprising:
    a throttle valve arranged within an intake passage connected with the engine body; and
    a throttle valve control module for controlling an opening of the throttle valve, the throttle valve control module controlling, when the diesel engine is in the deceleration state, the throttle valve to be throttled to an extent smaller than the opening of the throttle valve when the diesel engine is not in the deceleration state.

7. A method of controlling a diesel engine including an engine body having a cylinder to which fuel containing diesel fuel as its main component is supplied, an oxidation catalyst arranged within an exhaust passage connected with the engine body for purifying HC discharged from the cylinder, and a DPF arranged downstream of the oxidation catalyst for capturing soot contained within exhaust gas, and a system comprising a control device operatively linked to a fuel injection valve for injecting the fuel into the cylinder and to an intake valve and an exhaust valve provided to the cylinder having respective opening and closing timings, the method comprising:

- changing the opening and closing timings of at least one of the intake valve and the exhaust valve provided to the cylinder;
- supplying, when a predetermined DPF regeneration condition is satisfied, HC to the oxidation catalyst to regenerate the DPF by heat generated from an oxidation reaction of HC;
- stopping, when the diesel engine is in a deceleration state, a main injection of the fuel that is performed on a compression stroke of the cylinder;
- controlling, in a regeneration-in-deceleration state in which the diesel engine is in the deceleration state and the DPF regeneration condition is satisfied, the valve timing control module to perform either one of:
  a) an open-twice control of opening the intake valve on an intake stroke, the exhaust valve on an exhaust stroke, and additionally, the exhaust valve on the intake stroke or the intake valve on the exhaust stroke, or
  b) negative overlapping control of setting a period of time in which the intake valve and the exhaust valve are both closed on the exhaust stroke or the intake stroke,
- performing a post injection on an expansion stroke of the cylinder to supply HC into the exhaust gas to be supplied to the oxidation catalyst, and, even when the diesel engine is in the regeneration-in-deceleration state, prohibiting the post injection when a temperature of the oxidation catalyst is below a predetermined temperature, and
- in the regeneration-in-deceleration state, while the post injection is performed, prohibiting the open-twice control and the negative overlapping control, and while the post injection is prohibited, performing either one of the open-twice control or the negative overlapping control.

* * * * *